(12) United States Patent
McKenna et al.

(10) Patent No.: US 8,960,280 B2
(45) Date of Patent: Feb. 24, 2015

(54) METHOD FOR DETERMINING FRACTURE PLANE ORIENTATION USING PASSIVE SEISMIC SIGNALS

(71) Applicant: Microseismic, Inc., Houston, TX (US)

(72) Inventors: Jonathan P. McKenna, Golden, CO (US); Nathan M. Toohey, Golden, CO (US)

(73) Assignee: Microseismic, Inc., Houston, TX (US)

( * ) Notice: Subject to any disclaimer, the term of this patent is extended or adjusted under 35 U.S.C. 154(b) by 191 days.

(21) Appl. No.: 13/747,682

(22) Filed: Jan. 23, 2013

(65) Prior Publication Data

US 2014/0202688 A1 Jul. 24, 2014

(51) Int. Cl.
*E21B 47/14* (2006.01)
*G01V 1/30* (2006.01)

(52) U.S. Cl.
CPC .................................. *G01V 1/308* (2013.01)
USPC .......................... 166/250.1; 367/25; 367/38

(58) Field of Classification Search
USPC ..................................... 166/250.1; 367/25, 38
See application file for complete search history.

(56) References Cited

U.S. PATENT DOCUMENTS

| | | | |
|---|---|---|---|
| 5,675,488 A | 10/1997 | McElhinney | |
| 6,985,816 B2 | 1/2006 | Sorrells et al. | |
| 7,433,786 B2 | 10/2008 | Adams | |
| 8,064,288 B2 | 11/2011 | Liang | |
| 2011/0254552 A1 | 10/2011 | Wu et al. | |
| 2012/0318500 A1* | 12/2012 | Urbancic et al. | 166/250.1 |
| 2013/0215717 A1* | 8/2013 | Hofland et al. | 367/59 |
| 2014/0076543 A1 | 3/2014 | Ejofodomi et al. | |

OTHER PUBLICATIONS

International Search Report and Written Opinion, International Application PCT/US2014/011193.

* cited by examiner

*Primary Examiner* — William P Neuder
(74) *Attorney, Agent, or Firm* — Richard A. Fagin

(57) ABSTRACT

A method for determining fracture plane orientation from seismic signals detected above a subsurface formation of interest includes detecting seismic signals using an array of seismic sensors deployed above the subsurface formation during pumping of a hydraulic fracture treatment of the subsurface formation. A time of origin and a spatial position of origin (hypocenter) of microseismic events resulting from the hydraulic fracture treatment are determined. Time consecutively occurring ones of the hypocenters falling within a selected temporal sampling window are selected. A best fit line through the selected hypocenters using a preselected linear regression coefficient is determined. The selecting hypocenters and determining best fit lines is repeated for a selected number of windows.

5 Claims, 9 Drawing Sheets

METHOD FOR DETERMINING FRACTURE PLANE ORIENTATION USING PASSIVE SEISMIC SIGNALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to the field of mapping induced fractures in subsurface formations, more specifically, the disclosure relates to method for identifying orientation of fractures induced, for example, by hydraulic fracturing using passive seismic signals detected above the formation in which the fractures are induced.

Passive seismic-emission tomography is a technique that is used for, among other purposes, determining the hypocenter (i.e., place and time of origin) of microearthquakes such as formation fracturing that occurs in subsurface rock formations. Such microeathquakes may be naturally occurring or may be induced, for example, by pumping fluid into formations at sufficient pressure to cause failure, i.e., fracturing of the formation. In the latter case, it is useful to be able to determine progression of the fluid front as the fluid is pumped into the formations. One technique for performing such fluid front determination during fracture pumping is described in U.S. Pat. No. 7,663,970 issued to Duncan et al. incorporated herein by reference in its entirety. The technique described in the Duncan et al. '970 patent may be used to determine hypocenters of microseismic events (or microearthquakes) caused by failure of the subsurface rock formations as hydraulic fracturing fluid is pumped into the formations.

What is needed is a technique that can be used to determine orientation of fracture planes of such induced fractures.

SUMMARY

One aspect of the disclosure is a method for determining fracture plane orientation from seismic signals detected above a subsurface formation of interest that includes detecting seismic signals using an array of seismic sensors deployed above the subsurface formation during pumping of a hydraulic fracture treatment of the subsurface formation. A time of origin and a spatial position of origin (hypocenter) of microseismic events resulting from the hydraulic fracture treatment are determined. Hypocenters occurring consecutively within a nominated length of time or number of events window are selected. A best fit line through the selected hypocenters is evaluated for determining lineament orientation when the linear regression coefficient exceeds a preselected threshold. The process is continued for a selected number of windows to determine statistically significant orientation trends and respective ranges.

Other aspects and advantages will be apparent from the description and claims which follow.

DETAILED DESCRIPTION

Figure 1:
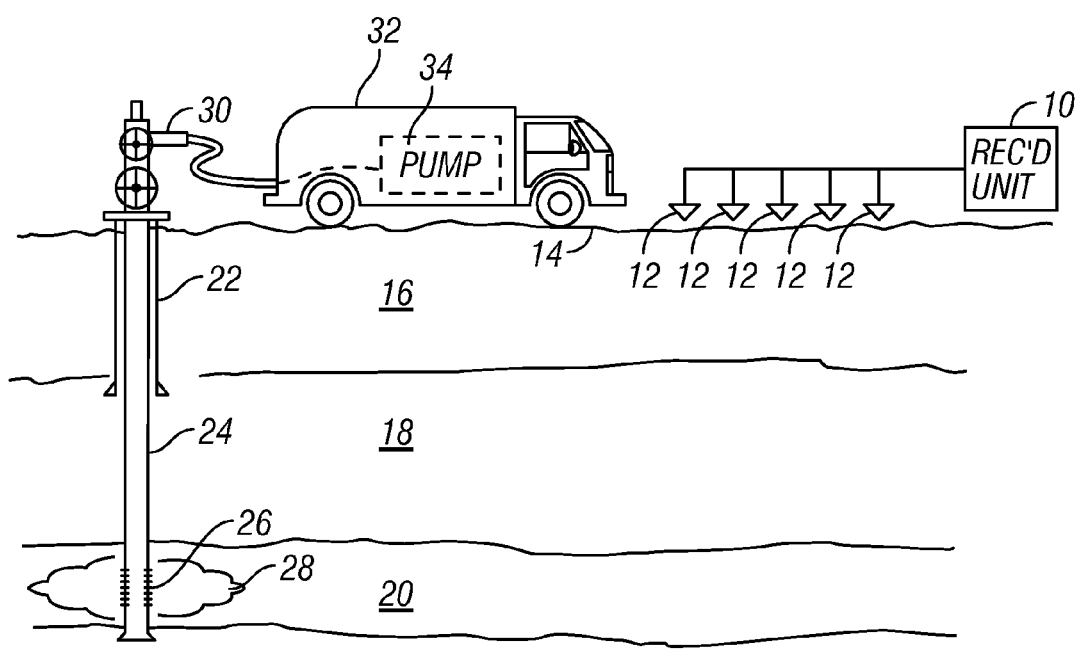
FIG. 1 shows an arrangement of seismic sensors used in a passive seismic method according to one embodiment of the invention associated with frac monitoring.

FIG. 1 shows a typical arrangement of seismic sensors as they would be used in one application of a method according to the present disclosure. The embodiment illustrated in FIG. 1 is associated with an application for passive seismic emission tomography known as "frac monitoring."

In FIG. 1, each of a plurality of seismic sensors, shown generally at 12, is deployed at a selected position proximate the Earth's surface 14. In marine applications, the seismic sensors would typically be deployed on the water bottom in a device known as an "ocean bottom cable." The seismic sensors 12 in the present embodiment may be geophones, but may also be accelerometers or any other sensing device known in the art that is responsive to velocity, acceleration or motion of the particles of the Earth proximate the sensor. The seismic sensors may be single component (i.e., having only one direction of sensitivity) or may be multi-component (i.e., having two or more sensitive directions). The seismic sensors 12 may generate electrical or optical signals in response to the particle motion or acceleration, and such signals are ultimately coupled to a recording unit 10 for making a time-indexed recording of the signals from each sensor 12 for later interpretation by a method according to the present disclosure. In other implementations, the seismic sensors 12 may be disposed at various positions within a wellbore drilled through the subsurface formations. A particular advantage of the method of the described herein is that it provides generally useful results when the seismic sensors are disposed at or near the Earth's surface. Surface deployment of seismic sensors is relatively cost and time effective as contrasted with subsurface sensor emplacements typically needed in methods known in the art prior to the present invention.

In some embodiments, the seismic sensors 12 may be arranged in sub-groups having spacing there between less than about one-half the expected wavelength of seismic energy from the Earth's subsurface that is intended to be detected. Signals from all the sensors in one or more of the subgroups may be added or summed to reduce the effects of noise in the detected signals.

In other embodiments, the seismic sensors 12 may be placed in a wellbore, either permanently for certain long-term monitoring applications, or temporarily, such as by wireline conveyance, tubing conveyance or any other sensor conveyance technique known in the art.

A wellbore 22 is shown drilled through various subsurface Earth formations 16, 18, through a hydrocarbon producing formation 20. A wellbore tubing 24 having perforations 26 formed therein corresponding to the depth of the hydrocarbon producing formation 20 is connected to a valve set known as a wellhead 30 disposed at the Earth's surface. The wellhead may be hydraulically connected to a pump 34 in a frac pumping unit 32. The frac pumping unit 32 is used in the process of pumping a fluid, which in some instances includes selected size solid particles, collectively called "proppant", are disposed. Pumping such fluid, whether propped or otherwise, is known as hydraulic fracturing. The movement of the fluid is shown schematically at the fluid front 28 in FIG. 1. In hydraulic fracturing techniques known in the art, the fluid is pumped at a pressure which exceeds the fracture pressure of the particular producing formation 20, causing it to rupture, and form fissures therein. The fracture pressure is generally related to the pressure exerted by the weight of all the formations 16, 18 disposed above the hydrocarbon producing formation 20, and such pressure is generally referred to as the "overburden pressure." In propped fracturing operations, the particles of the proppant move into such fissures and remain therein after the fluid pressure is reduced below the fracture pressure of the formation 20. The proppant, by appropriate selection of particle size distribution and shape, forms a high permeability channel in the formation 20 that may extend a great lateral distance away from the tubing 24, and such channel remains permeable after the fluid pressure is relieved. The effect of the proppant filled channel is to increase the effective radius of the wellbore 24 that is in hydraulic communication with the producing formation 20, thus substantially increasing productive capacity of the wellbore 24 to hydrocarbons.

The fracturing of the formation 20 by the fluid pressure creates seismic energy that is detected by the seismic sensors 12. The time at which the seismic energy is detected by each of the sensors 12 with respect to the time-dependent position in the subsurface of the formation fracture caused at the fluid front 28 is related to the acoustic velocity of each of the formations 16, 18, 20, and the position of each of the seismic sensors 12. One example technique for determining the place (position in space in the subsurface) and time of origin ("hypocenter") of each microseismic event is described in U.S. Pat. No. 7,663,970 issued to Duncan et al. and incorporated by reference as if fully set forth herein.

While the wellbore shown in FIG. 1 extends essentially vertically through the formations, it will be appreciated by those skilled in the art that the geodetic trajectory of the wellbore in other examples may be deviated from vertical, or may be drilled initially vertically and then have the trajectory changed so that the wellbore follows a selected path through the formations. Examples of such trajectory may include following the geologic layering attitude of the formations, e.g., horizontal or nearly horizontal, so that the wellbore extends for a substantial lateral distance through one or more selected formations.

Having explained one type of passive seismic data that may be used with methods according to the invention, a method for processing such seismic data will now be explained. The seismic signals recorded from each of the sensors 12 may be processed first by certain procedures well known in the art of seismic data processing, including the summing described above, and various forms of filtering. In some embodiments, the sensors 12 may be arranged in directions substantially along a direction of propagation of acoustic energy that may be generated by the pumping unit 32, in the embodiment of FIG. 1 radially outward away from the wellhead 30. By such arrangement of the seismic sensors 12, noise from the pumping unit 32 and similar sources near the wellhead 30 may be attenuated in the seismic signals by frequency-wavenumber (f k) filtering. Other processing techniques for noise reduction and/or signal enhancement will occur to those of ordinary skill in the art.

Figure 2:
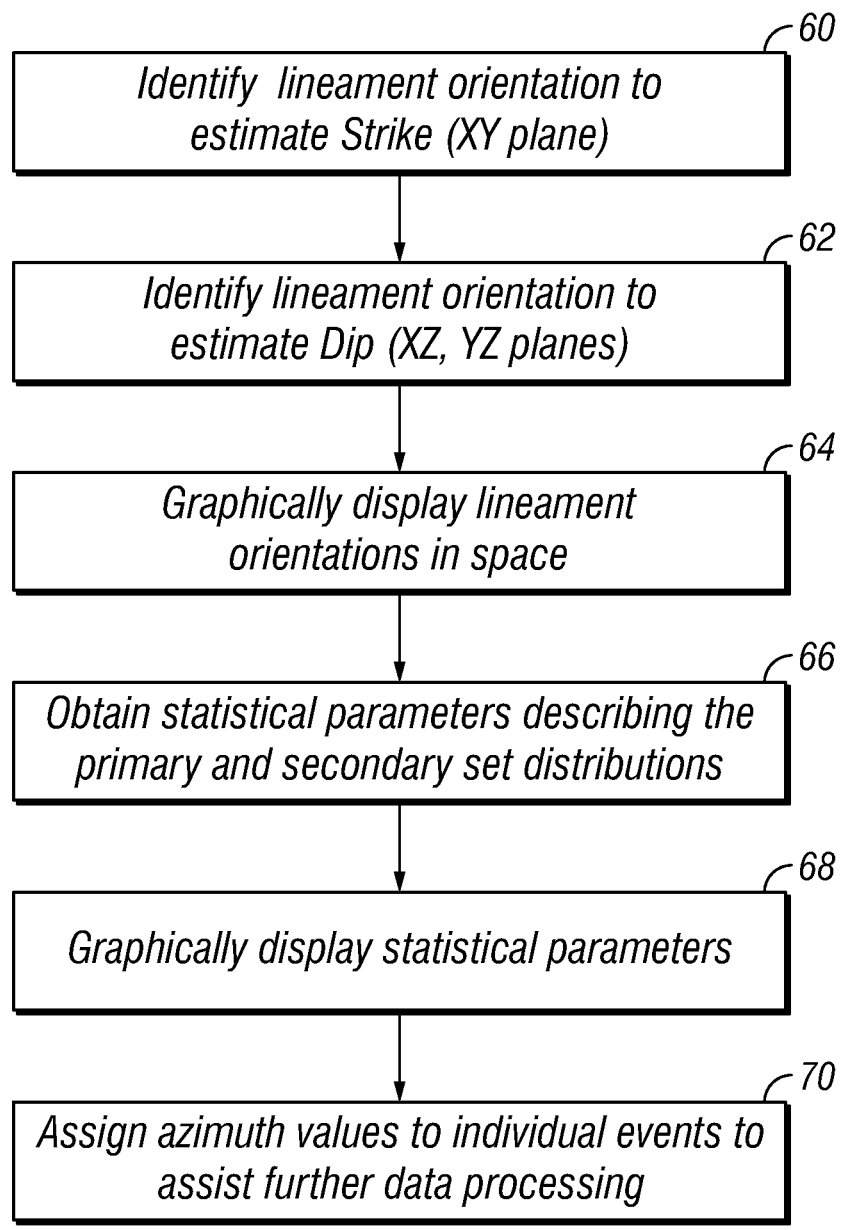
FIG. 2 shows a flow chart of an example implementation of a fracture plane orientation determination procedure.

A flow chart of an example process for determining fracture plane orientation is shown in FIG. 2. At 60, linear features ("lineaments") which may correspond to formation fracture planes may be identified from the event hypocenters determined as explained above. At 60, the "strike" (geologic direction of the fracture plane projected into the horizontal plane may be determined. At 62, the "dip" or angle of the identified fracture planes may be determined from the determined hypocenters.

Figure 7:
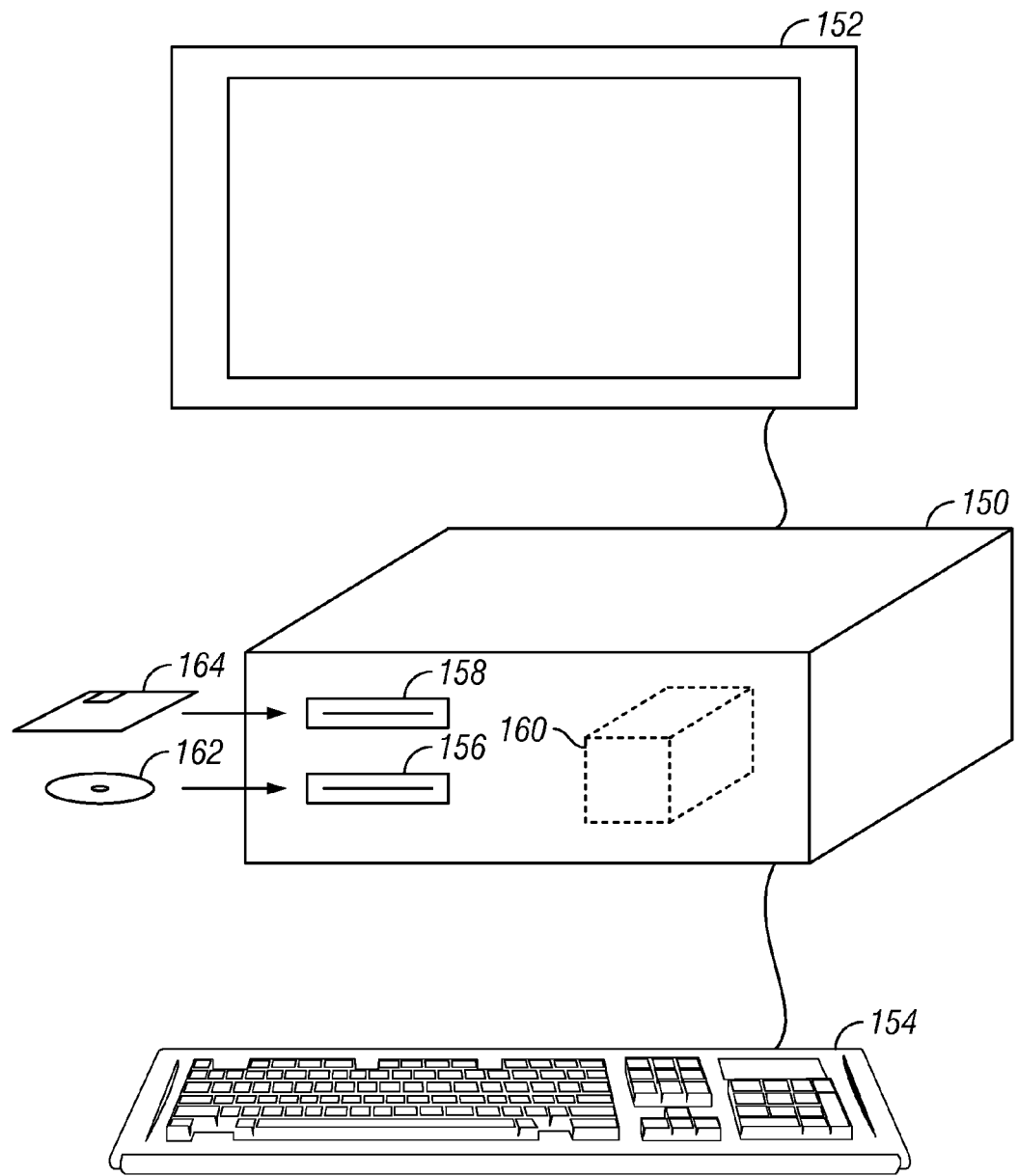
FIG. 7 shows an example computer system that may be used to perform a method according to the present disclosure.

At 64, in some examples, a visual display (see FIG. 7) may be generated for purposes of visual analysis of the identified fracture planes in three dimensional space. At 66, strikes and dips of a plurality of identified fracture planes may be statistically analyzed, e.g., by numbers of occurrences of each value of strike and dip identified as explained above. At 68, the statistical analysis may be used to generate a visual display (FIG. 7). Using the visual display or predetermined selection criteria, the statistically analyzed lineament information may be used for further analysis.

Figure 3:
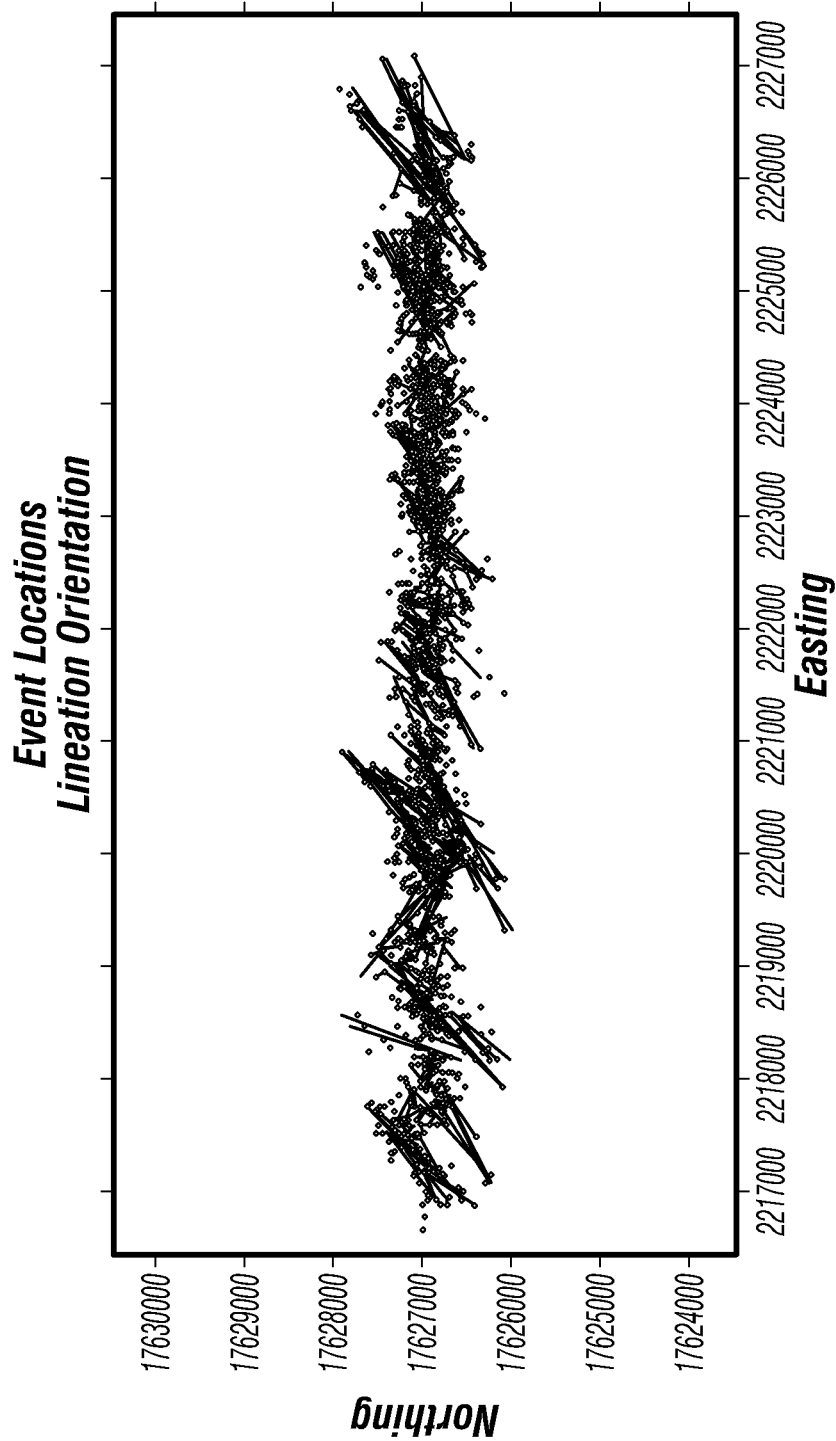
FIG. 3 shows graphically an example of lineament analysis.

Referring to FIG. 3, an example of lineament analysis is shown graphically. Individual hypocenters are represented in the figure as dots indicating the spatial position of each determined hypocenter. In the example shown in FIG. 3, the portion of a wellbore for which the lineaments are determined is substantially along the bedding plane of one of the formations such as shown in FIG. 1. The lines passing through clusters of identified hypocenters represent lineaments identified as will be explained below.

An example of calculation of lineaments using the determined hypocenters may include selecting a predetermined number of consecutive hypocenters to filter the determined hypocenters with reference to a time of origin, e.g., at the beginning of fracture fluid pumping. For example, a temporal sampling window of a selected number, in the present example four, hypocenters occurring sequentially in time may be used to assist in identification of microseismic event hypocenters that are likely to have resulted from the same microeathquake or microseismic event (e.g., an induced fracture). In other examples, selected length time windows may be used, for example, several minutes to several hours in duration depending on progress of the fracture treatment and the quality of the received signals. Within the selected temporal sampling window, the spatial position of each hypocenter (determined, e.g., as explained above) may be processed by linear regression analysis using a predetermined minimum regression coefficient ($R^2$), which may be, for example, 0.8, although other values may be used depending on the quality of the data obtained and the apparent degree to which hypocenters appear to correspond to linear features in the subsurface. A best-fit line through the selected hypocenters in each window which fall within the regression coefficient may be identified as a fracture plane. As explained above, the strike and dip of the fracture plane may be determined by the three-dimensional orientation of the best-fit line. Hypocenters which do not result in a best-fit line having the minimum regression coefficient may be excluded from the analysis, and the window may be moved to at least one consecutive event (or moved in time by a selected value). The foregoing procedure may be repeated for all the hypocenters, or selected subsets thereof, determined for the entire hydraulic fracturing procedure explained with reference to FIG. 1. At the completion of the analysis of all the hypocenters, a plot such as shown in FIG. 3 may be generated for visual analysis of the determined fracture planes. The true dip of the fracture plane may be determined, for example using the following expressions:

$$\tan\delta = \frac{\tan\alpha}{\sin\beta}$$

$$\delta = \tan^{-1}\frac{\tan\alpha}{\sin(S - S_{xs})}$$

δ in the above expressions is the true fracture plane dip, α is an apparent dip, β is $S-S_{xs}$, S is true strike and $S_{xs}$ is the cross-sectional azimuth (90° for the XZ plane and 0° for YZ plane).

Figure 4A:
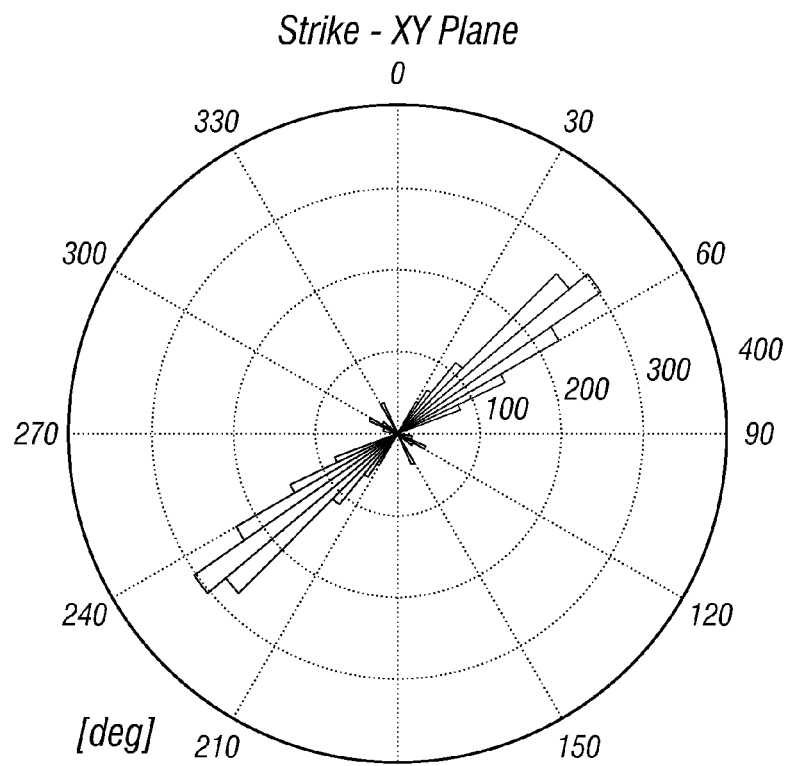
FIG. 4A shows how the fracture planes may be statistically analyzed.
Figure 4B:
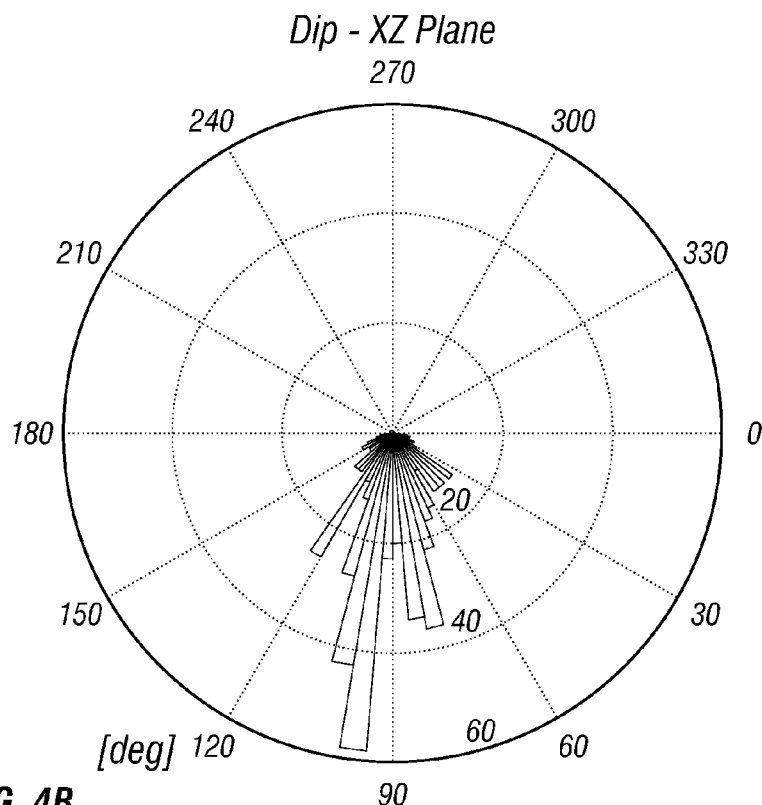
FIG. 4B shows a polar coordinate plot of the X-component (i.e., east-west direction) of the dip of the identified lineaments shown in FIG. 4A.
Figure 4C:
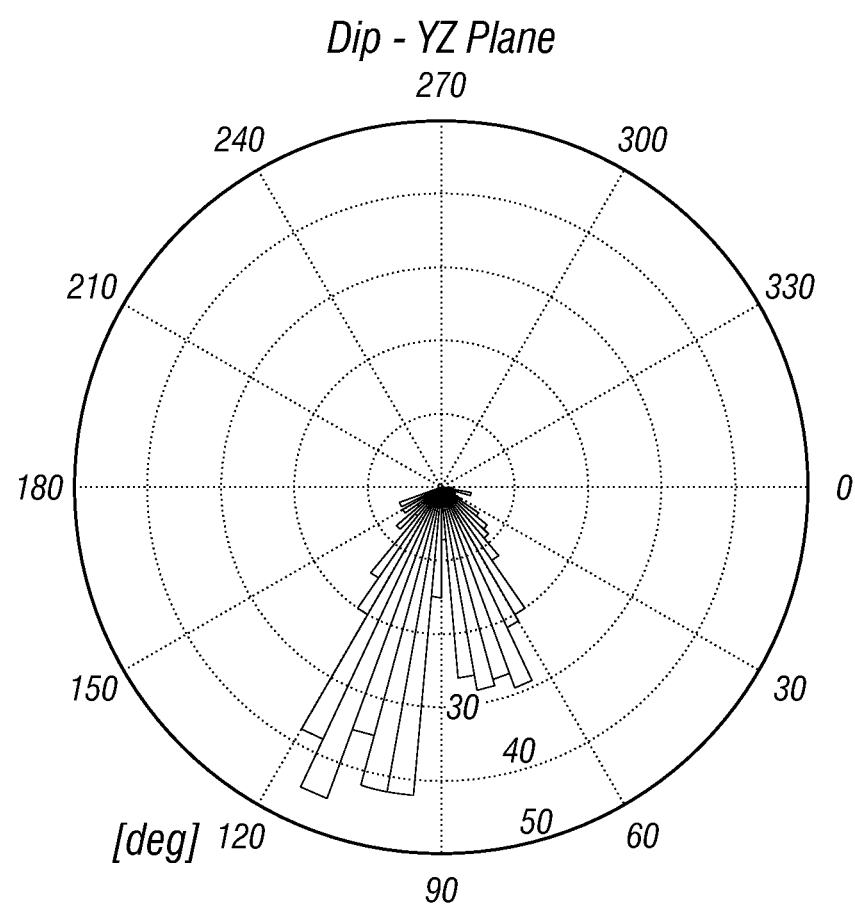
FIG. 4C shows a polar coordinate plot of the Y component (north-south direction) component of the dip of the identified lineaments shown in FIG. 4A.

Referring to FIG. 4A, the fracture planes determined as explained above may be statistically analyzed, as explained above, for example, by determining numbers of fracture planes and their geologic direction (strike and dip). FIG. 4A shows a polar coordinate plot of numbers of occurrences along selected geodetic directions projected into the horizontal plane (XY plane). FIG. 4B shows a polar coordinate plot of the X-component (i.e., east-west direction) of the dip of the identified lineaments shown in FIG. 4A. FIG. 4C shows a polar coordinate plot of the Y component (north-south direction) component of the dip of the identified lineaments shown in FIG. 4A.

Figure 5:
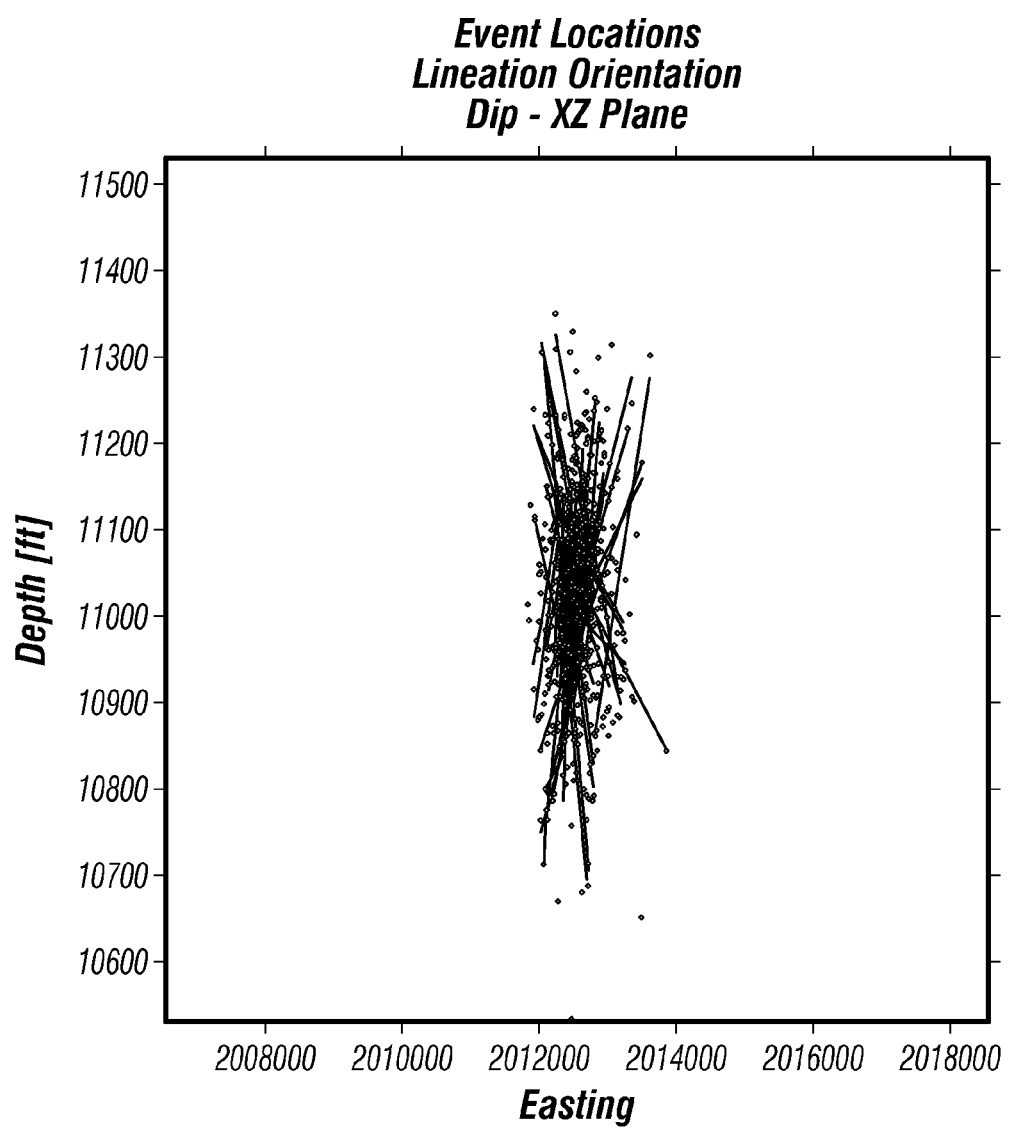
FIG. 5 shows another example lineament identification plot generated using a temporal sampling window of four time-consecutive hypocenters.
Figure 6B:
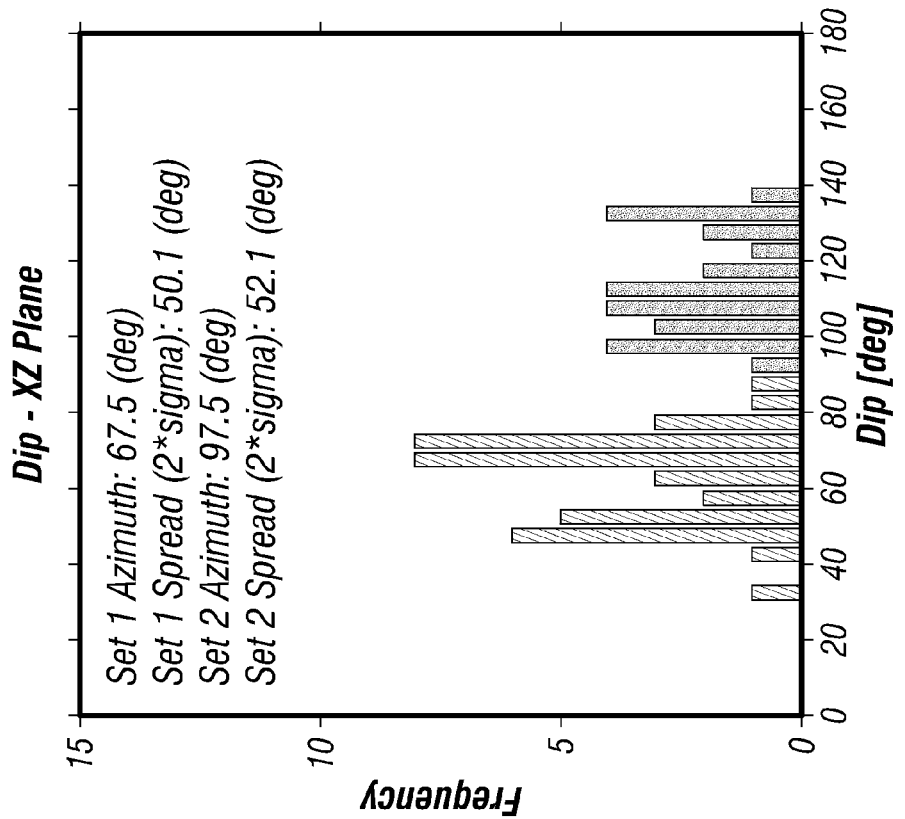
FIG. 6B shows the same components in histogram format.
Figure 6A:
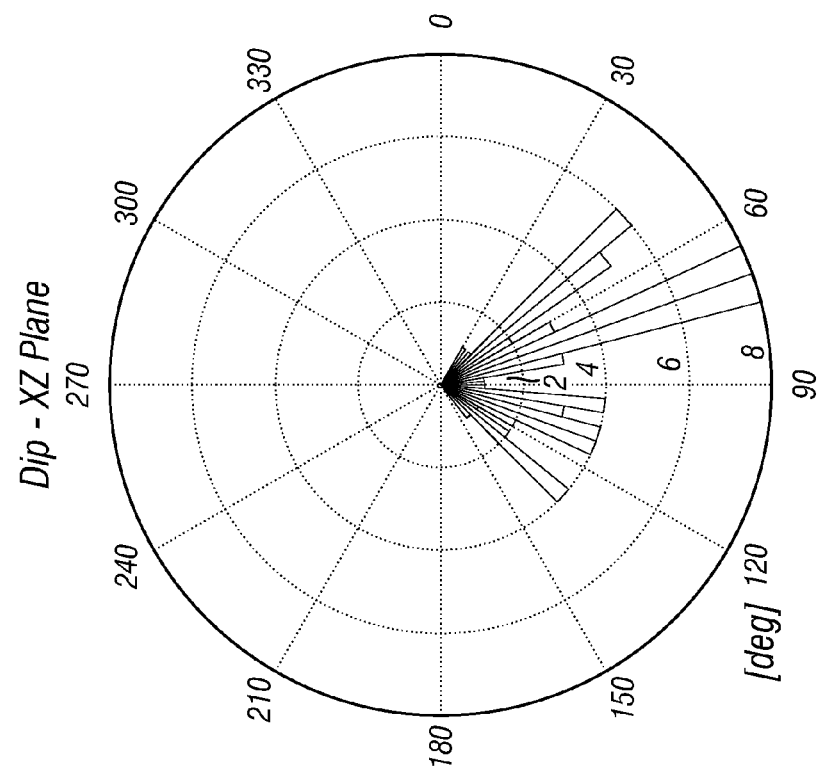
FIG. 6A shows a polar coordinate plot of the X component of the apparent dip of the lineaments identified in FIG. 5.
Figure 6C:
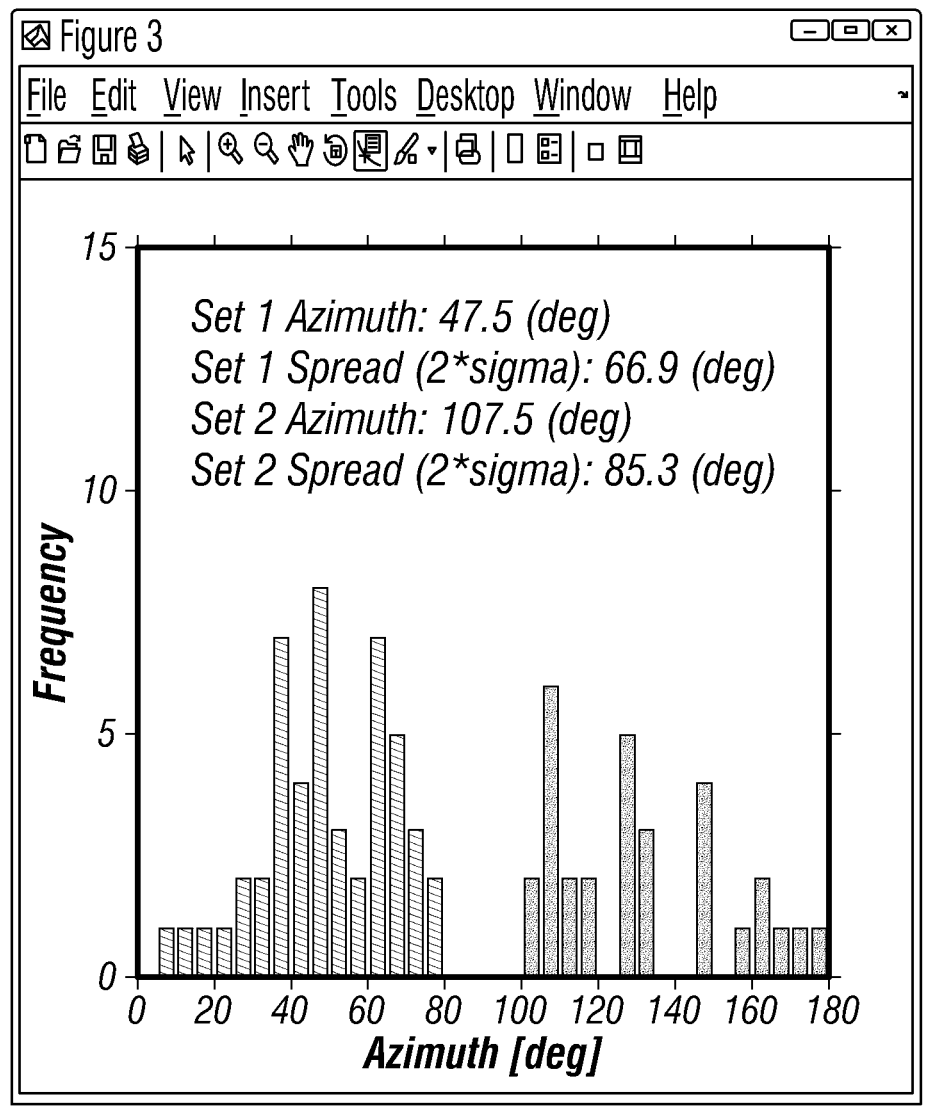
FIG. 6C shows another histogram of identified lineament directions that may be used to determine a most likely strike and dip of the identified lineaments.

FIG. 5 shows another example lineament identification plot generated using a temporal sampling window of four time-consecutive hypocenters. Best-fit lines may be identified using, for example, a minimum regression coefficient of 0.8. FIG. 6A shows a polar coordinate plot of the X component of the apparent dip of the lineaments identified in FIG. 5. FIG. 6B shows the same components in histogram format. The distribution of directional values shown in FIG. 6B may be used, for example, to define an approximate geodetic direction (strike and/or dip) of the lineaments identified as explained above. FIG. 6C shows another histogram of identified lineament directions that may be used to determine a most likely strike and dip of the identified lineaments in order to estimate the expected orientation of fracture planes resulting from the fracturing procedure explained with reference to FIG. 1. The statistical analysis involves calculating what typically result in two major orientation trends (subpopulations) as well as their respective ranges. This information is useful because when a fracture network is modeled, it is important to know the orientations and full range of the subpopulations to model the fracture network(s) appropriately.

Referring to FIG. 7, the foregoing process as explained with reference to FIGS. 1-6, can be embodied in computer-readable code. The code can be stored on a computer readable medium, such as a solid state memory card or similar plug in device 164, CD-ROM 162 or a magnetic (or other type) hard drive 166 forming part of a general purpose programmable computer. The computer, as known in the art, includes a central processing unit 150, a user input device such as a keyboard 154 and a user display 152 such as a flat panel LCD display or cathode ray tube display. According to this aspect of the invention, the computer readable medium includes logic operable to cause the computer to execute acts as set forth above and explained with respect to the previous figures. The computer, as explained above, may be in the recording unit (10 in FIG. 1) or may be any other computer.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining fracture plane orientation from seismic signals detected above a subsurface formation of interest, comprising:
    detecting seismic signals using an array of seismic sensors deployed above the subsurface formation during pumping of a hydraulic fracture treatment of the subsurface formation, the seismic sensors each generating a signal corresponding to seismic amplitude;
    in a computer, determining a time of origin and a spatial position of origin (hypocenter) of microseismic events resulting from the hydraulic fracture treatment using the detected seismic signals;
    in the computer selecting time consecutively occurring ones of the hypocenters falling within at least one selected temporal sampling window, the at least one temporal sampling window including at least one of a selected number of consecutively occurring events and a selected length of time;
    in the computer determining a best fit line through the selected hypocenters using a preselected minimum linear regression coefficient;
    in the computer repeating the selecting hypocenters and determining best fit lines for additional selected temporal sampling windows; and
    in the computer, determining spatial orientation of the best fit lines; and
    in the computer, determining fracture plane orientations from the best fit lines.

2. The method of claim 1 further comprising determining in the computer numbers of best fit lines occurring along selected spatial directions.

3. The method of claim 2 further comprising determining most likely fracture plane orientations using statistical analysis of the best fit lines.

4. The method of claim 3 further comprising displaying the numbers of best fit lines on a polar coordinate plot.

5. The method of claim 3 further comprising displaying the numbers of best fit lines on a histogram.

* * * * *